(12) United States Patent
Thomas et al.

(10) Patent No.: US 7,428,774 B2
(45) Date of Patent: Sep. 30, 2008

(54) BAFFLE FOR AN AUTOMOTIVE VEHICLE AND METHOD OF USE THEREFOR

(75) Inventors: Matthew Thomas, Imlay City, MI (US); Amy Ingram-Hill, Sterling Heights, MI (US)

(73) Assignee: Zephyros, Inc., Romeo, MI (US)

( * ) Notice: Subject to any disclaimer, the term of this patent is extended or adjusted under 35 U.S.C. 154(b) by 457 days.

(21) Appl. No.: 11/136,742

(22) Filed: May 25, 2005

(65) Prior Publication Data

US 2005/0230165 A1    Oct. 20, 2005

(51) Int. Cl.
*B21D 47/00* (2006.01)
*B23P 11/00* (2006.01)
*B60J 7/00* (2006.01)
*B29C 33/48* (2006.01)
*B29C 45/14* (2006.01)

(52) U.S. Cl. ............... 29/525.13; 29/897.1; 29/897.2; 296/187.01; 296/187.02; 296/33; 296/34; 264/45.2; 264/46.5; 264/259; 264/261

(58) Field of Classification Search ............... 264/45.2, 264/46.5–46.7, 173.16–173.17, 177.1, 259, 264/261–263; 277/630, 645–646, 650, 944; 296/204, 203.1, 202, 187.01, 146.9, 46.9, 296/39.3, 34, 33; 29/525.13, 897.1–897.2
See application file for complete search history.

(56) References Cited

U.S. PATENT DOCUMENTS

| | | |
|---|---|---|
| 4,463,870 A | 8/1984 | Coburn, Jr. et al. |
| 4,810,548 A | 3/1989 | Ligon, Sr. et al. |
| 5,506,025 A | 4/1996 | Otto et al. |
| 5,631,027 A | 5/1997 | Takabatake |
| 5,642,914 A | 7/1997 | Takabatake |
| 5,725,272 A | 3/1998 | Jones |
| 5,766,719 A | 6/1998 | Rimkus |
| 5,806,915 A | 9/1998 | Takabatake |
| 5,904,024 A | 5/1999 | Miwa |
| 6,093,358 A | 7/2000 | Schiewe et al. |
| 6,099,948 A | 8/2000 | Paver, Jr. |
| 6,103,341 A | 8/2000 | Barz et al. |
| 6,129,410 A | 10/2000 | Kosaraju et al. |
| 6,146,565 A | 11/2000 | Keller |
| 6,150,428 A | 11/2000 | Hanley, IV et al. |
| 6,237,304 B1 | 5/2001 | Wycech |
| 6,247,287 B1 | 6/2001 | Takabatake |

(Continued)

FOREIGN PATENT DOCUMENTS

DE    38 38 655 A1    5/1990

(Continued)

OTHER PUBLICATIONS

Lilley et al., Comparison of Preformed Acoustic Baffles and Two-Component Polyurethane Foams for Filling Body Cavities.

(Continued)

*Primary Examiner*—David P. Bryant
*Assistant Examiner*—Alexander P Taousakis
(74) *Attorney, Agent, or Firm*—Dobrusin & Thennisch PC

(57) ABSTRACT

There is disclosed a baffle for inhibiting the passage of sound, debris or the like through a cavity of an automotive vehicle.

29 Claims, 7 Drawing Sheets

U.S. PATENT DOCUMENTS

| | | |
|---|---|---|
| 6,281,260 B1 | 8/2001 | Hanley, IV et al. |
| 6,319,964 B1 | 11/2001 | Blank et al. |
| 6,347,799 B1 | 2/2002 | Williams et al. |
| 6,368,438 B1 | 4/2002 | Chang et al. |
| 6,382,635 B1 | 5/2002 | Fitzgerald |
| 6,383,610 B1 | 5/2002 | Barz et al. |
| 6,406,078 B1 | 6/2002 | Wycech |
| 6,413,611 B1 | 7/2002 | Roberts et al. |
| 6,419,305 B1 | 7/2002 | Larsen |
| 6,482,486 B1 | 11/2002 | Czaplicki et al. |
| 6,491,336 B1 | 12/2002 | Beckmann et al. |
| 6,691,468 B2 | 2/2004 | Helferty |
| 6,722,720 B2 | 4/2004 | Donick et al. |
| 6,777,049 B2 | 8/2004 | Sheldon et al. |
| 6,905,745 B2 | 6/2005 | Sheldon et al. |
| 6,920,693 B2 | 7/2005 | Hankins et al. |
| 6,928,736 B2 | 8/2005 | Czaplicki et al. |
| 6,953,219 B2 | 10/2005 | Lutz et al. |
| 7,114,763 B2 * | 10/2006 | Riley et al. ............ 296/187.03 |
| 2002/0074827 A1 | 6/2002 | Fitgerald et al. |
| 2002/0164450 A1 | 11/2002 | Lupini et al. |
| 2003/0090129 A1 * | 5/2003 | Riley et al. ............ 296/203.03 |
| 2003/0091806 A1 * | 5/2003 | Staelgraeve et al. ...... 428/297.4 |
| 2004/0011282 A1 | 1/2004 | Myers et al. |
| 2004/0018341 A1 * | 1/2004 | Richardson et al. ......... 428/138 |
| 2005/0081383 A1 | 4/2005 | Kosal et al. |
| 2005/0082111 A1 | 4/2005 | Weber |
| 2005/0126848 A1 | 6/2005 | Sianoshai |
| 2005/0127145 A1 | 6/2005 | Czaplicki et al. |
| 2005/0194706 A1 | 9/2005 | Kosal et al. |
| 2005/0212326 A1 | 9/2005 | Marion |
| 2005/0212332 A1 | 9/2005 | Sheldon et al. |
| 2006/0043772 A1 * | 3/2006 | Richardson ............ 296/187.02 |

FOREIGN PATENT DOCUMENTS

| | | |
|---|---|---|
| EP | 0 679 501 A1 | 11/1995 |
| EP | 0 697 956 B1 | 2/1996 |
| EP | 0 891 918 A1 | 1/1999 |
| EP | 1 134 126 B1 | 3/2001 |
| EP | 1 031 496 B1 | 12/2001 |
| EP | 1 182 087 A2 | 2/2002 |
| EP | 1 362 683 | 11/2003 |
| JP | 3-197743 | 8/1991 |
| JP | 10-45031 | 2/1998 |
| JP | 10053156 | 2/1998 |
| JP | 10-71628 | 3/1998 |
| JP | 2000-52444 | 2/2000 |
| JP | 2002-62833 | 3/2001 |
| JP | 2002331960 | 11/2002 |
| JP | 2002-362412 | 12/2002 |
| WO | WO98/50221 | 5/1998 |
| WO | WO99/08854 | 2/1999 |
| WO | WO00/03894 | 1/2000 |
| WO | WO00/38863 | 7/2000 |
| WO | WO01/19667 A1 | 3/2001 |
| WO | WO01/54936 | 8/2001 |
| WO | WO01/71225 | 9/2001 |
| WO | WO01/83206 | 11/2001 |
| WO | WO 01/88033 | 11/2001 |
| WO | WO03/051676 | 6/2003 |
| WO | WO2005/044630 | 5/2005 |

OTHER PUBLICATIONS

Lilley et al., A Comparison of NVH Treatments for Vehicle Floorplan Applications.
Lilley et al., Vehicle Acoustic Solutions.
Copending U.S. Appl. No. 10/718,509, filed Nov. 20, 2003.
Copending U.S. Appl. No. 10/761,635, filed Jan. 21, 2004.
Copending U.S. Appl. No. 10/839,084, filed May 5, 2004.
Copending U.S. Appl. No. 10/806,309, filed Mar. 22, 2004.
Copending Patent Application Serial No. GB 0220945.0 filed Sep. 10, 2002.
Copending Patent Application Serial No. EP 0300159.1 filed Jan. 6, 2003.
Copending U.S. Appl. No. 10/920,520, filed Aug. 18, 2004.
Copending U.S. Appl. No. 10/941,553, filed Sep. 15, 2004.
Copending U.S. Appl. No. 10/973,050, filed Oct. 25, 2004.
Copending U.S. Appl. No. 10/967,783, filed Nov. 20, 2004.
Copending U.S. Appl. No. 10/873,935, filed Jun. 22, 2004.
Copending U.S. Appl. No. 11/115,668, filed Apr. 27, 2005.
Copending U.S. Appl. No. 60/675,581, filed Apr. 28, 2005.
Copending U.S. Appl. No. 60/676,406, filed Apr. 29, 2005.
Copending U.S. Appl. No. 60/680,268, filed May 12, 2005.
Copending U.S. Appl. No. 60/674,919, filed Apr. 26, 2005.
Baffle Part Disclosure, Figure 1, Nov. 2002, 3 pages.
Copending U.S. Appl. No. 60/592,691, filed Jul. 30, 2004.
Copending U.S. Appl. No. 60/623,099, filed Oct. 28, 2004.
Copending U.S. Appl. No. 10/927,349, filed Aug. 26, 2004.

* cited by examiner

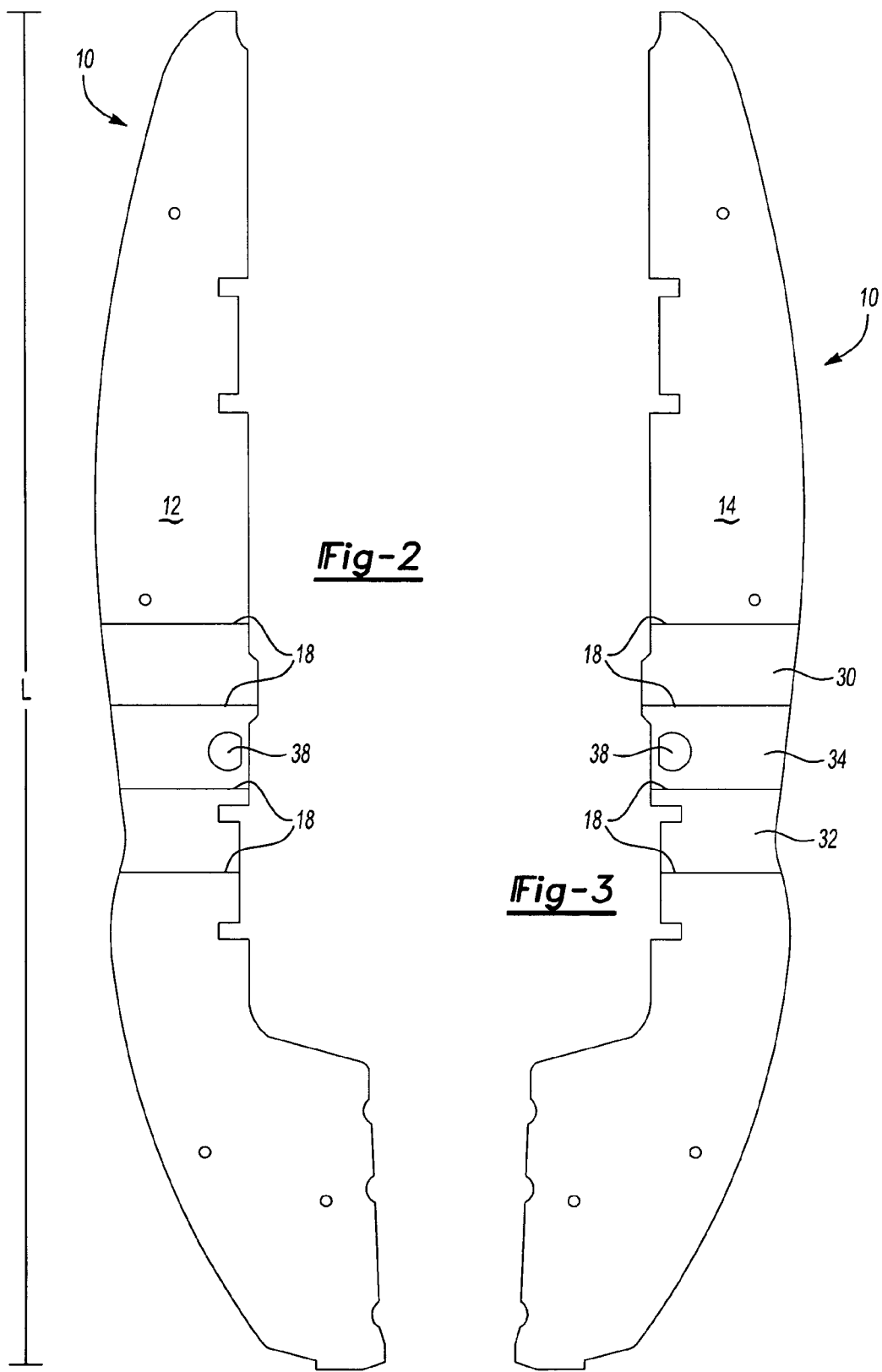

US 7,428,774 B2

BAFFLE FOR AN AUTOMOTIVE VEHICLE AND METHOD OF USE THEREFOR

FIELD OF THE INVENTION

The present invention relates generally to an insert or baffle for an automotive vehicle and more particularly to a baffle designed to accommodate one or more components of the automotive vehicle.

BACKGROUND OF THE INVENTION

With the proliferation of new vehicle designs, it has become increasingly difficult to design baffles for minimization of sound transmission to automotive vehicle interior passenger compartments. New vehicle designs can create cavities that are difficult for baffles to seal because of the shape, location, size or the like of the cavities. Additionally, such cavities can be difficult to access, which, in turn, can cause difficulties for assembling baffles to the vehicles. New vehicle designs can also cause vehicle components such as fasteners or other components to be positioned in different locations within a vehicle and, as a consequence, baffles may have to be designed to accommodate such components while still being able to effectively seal or baffle components or cavities for minimizing sound transmission. As one example, it can be particularly difficult to design baffles to seal cavities between a forward body panel (e.g., a front quarter or fender panel) and an A-pillar of an automotive vehicle (e.g., a pick-up truck), particularly when the body panel is connected to the A-pillar with one or more fasteners.

The present invention provides a baffle for addressing one or more of the difficulties discussed above.

SUMMARY OF THE INVENTION

Accordingly, there is provided a baffle having one or more carrier layers and a layer of expandable material that is preferably substantially coextensive with the one or more carrier layers. Typically, the baffle has opening for receiving one or more fasteners designed to assist in desirably locating the baffle in a cavity of a structure of an automotive vehicle. The baffle also typically includes an additional opening (e.g., a through-hole) for accommodating a component of the automotive vehicle. In one preferred embodiment, the opening is suitable for allowing a bolt to be extended through the opening.

BRIEF DESCRIPTION OF THE DRAWINGS

The features and inventive aspects of the present invention will become more apparent upon reading the following detailed description, claims, and drawings, of which the following is a brief description:

FIG. 2 is a front view of the exemplary baffle of FIG. 1.

FIG. 3 is a rear view of the exemplary baffle of FIG. 1

DETAILED DESCRIPTION OF THE PREFERRED EMBODIMENT

The present invention is predicated upon providing an improved system for sealing and baffling a cavity of an automotive vehicle. The baffle typically includes one or more of the following:

1) at least one, but preferably a pair of carrier members (e.g., carrier layers); and
2) a layer of expandable material at least partially disposed upon the one or more carrier members.

Figure 1:
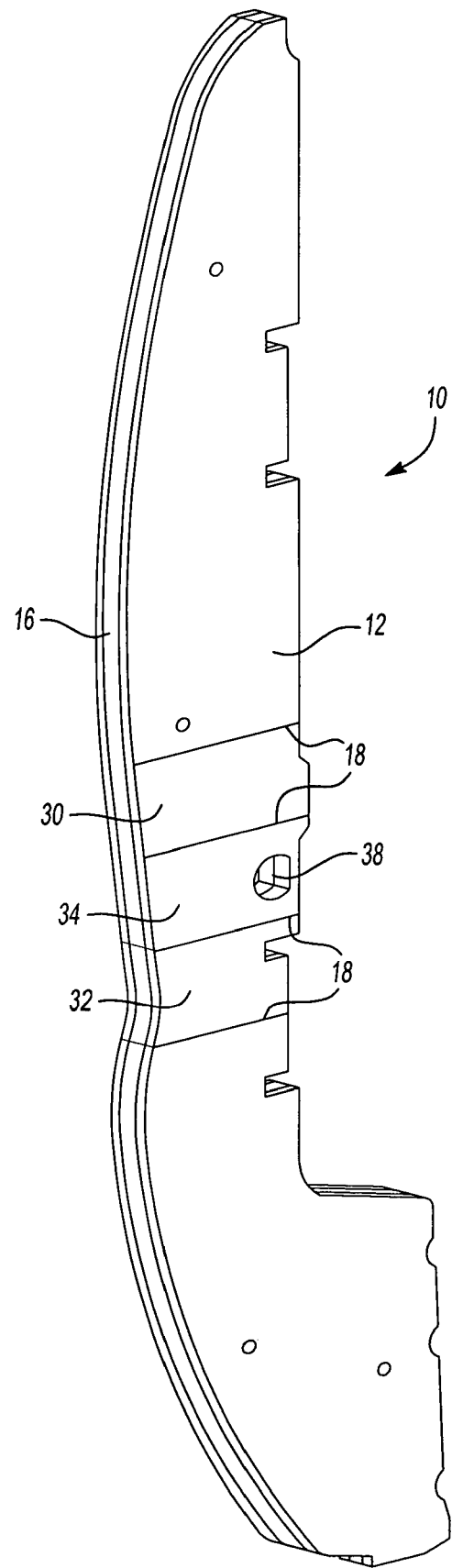
FIG. 1 is a perspective view of an exemplary baffle in accordance with an aspect of the present invention.
Figure 4:
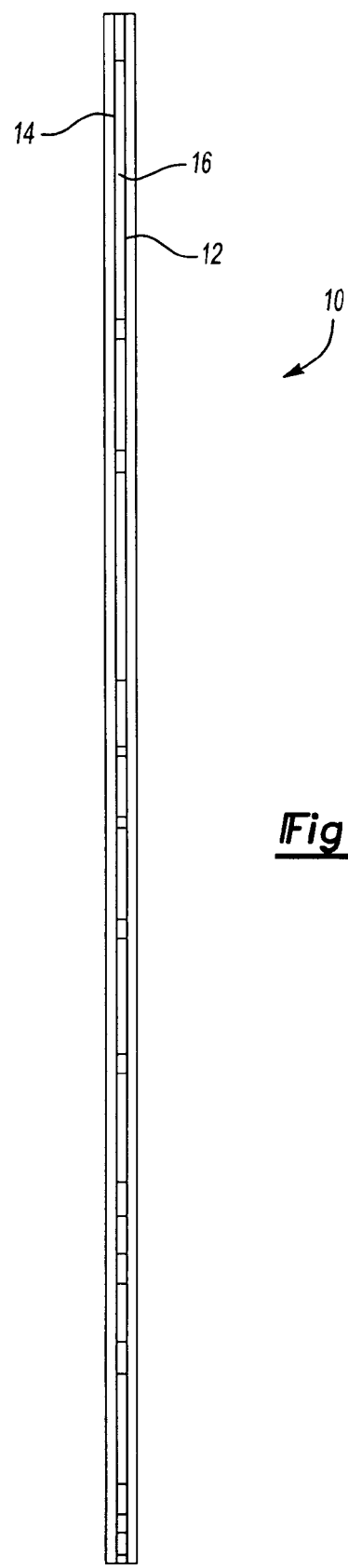
FIG. 4 is a side view of the exemplary baffle of FIG. 1.
Figure 5:
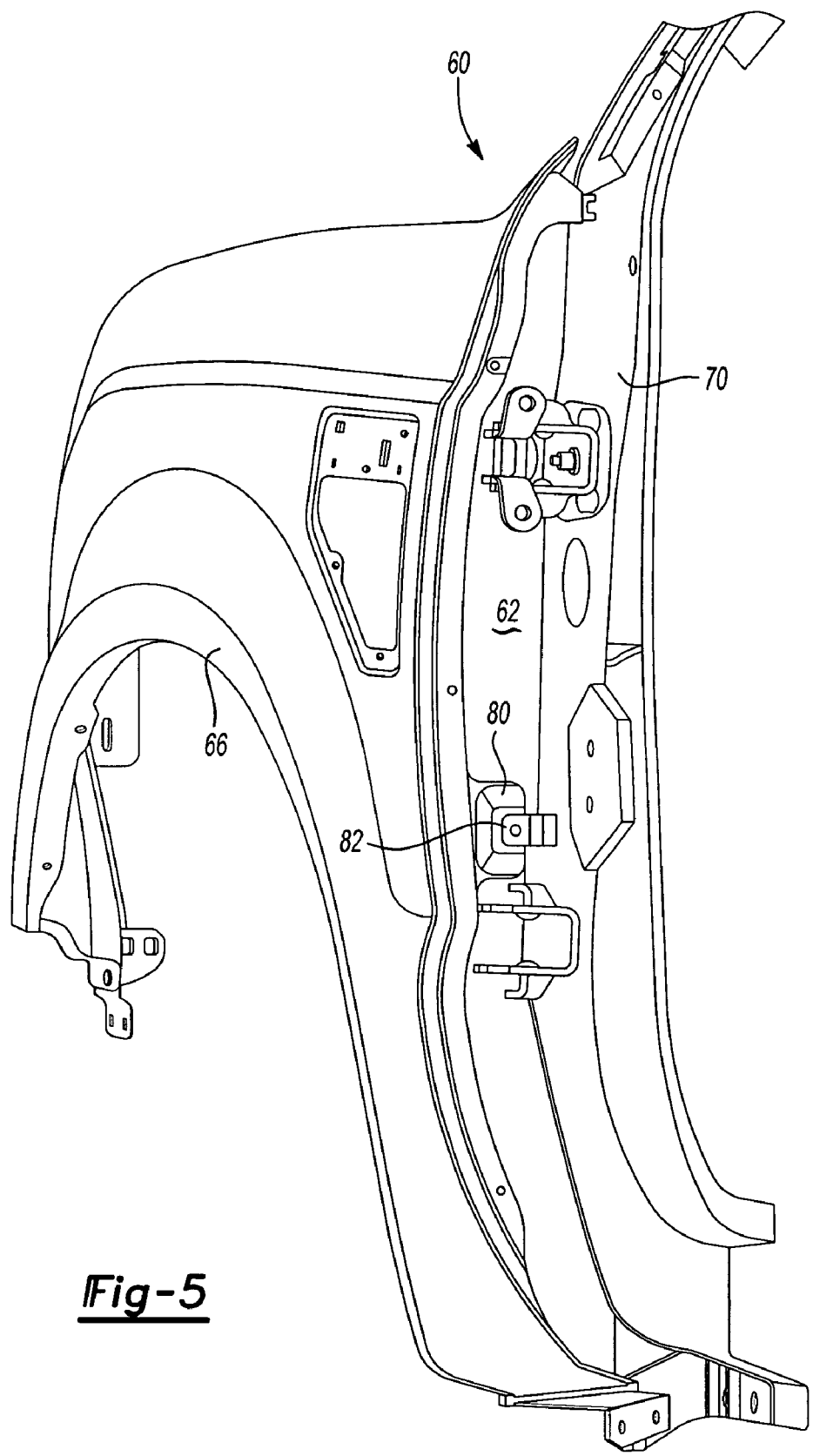
FIG. 5 is a rear view of a portion of an automotive vehicle prior to assembly of the exemplary baffle of FIGS. 1-4.

Referring to FIGS. 1-5, there is illustrated an exemplary baffle 10 formed in accordance with the present invention. The baffle 10 includes a first carrier layer 12, a second carrier layer 14 and a layer 16 of expandable material. The first carrier layer 12 opposes the second carrier layer 14 and is substantially coextensive therewith.

Each of the carrier layers 12, 14 include a plurality of bend locations 18. As used herein, unless otherwise stated, bend locations include actual bends of the carrier layer or deformations (e.g., scores, grooves, indents, markings, combination thereof or the like) which indicate locations that are bent when the baffle 10 is installed in an automotive vehicle. In the particular embodiment shown, each of the carrier layers 12, 14 include four bend locations 18 and the four bend locations 18 of the first carrier layer 12 are opposite the four bend locations 18 of the second carrier layer 14.

The first carrier layer 12 may be made of the same material or a different material than the second carrier layer 14. Typically, the layers 12, 14 are made of flexible materials such as fabrics, fibrous materials, plastic films or the like. In one preferred embodiment, both of the carrier layers 12, 14 are formed of flexible metal foil. However, it is also contemplated that the carrier layers could be formed of more rigid materials such as molded or otherwise formed thermoplastics (e.g., polyamide), metal stampings, molded thermosets, composites, metal foam or the like.

In the embodiment shown, the layer 16 of expandable material is sandwiched between the first carrier layer 12 and the second carrier layer 14 for forming the baffle 10. The layer 16 of expandable material is substantially coextensive with the first carrier layer 12 and the second carrier layer 14.

The first carrier layer 12, the second carrier layer 14 and the layer 16 of expandable material and therefore, the baffle 10, each include a length (L) with a tapered upper end and a tapered lower end. Advantageously, at a central area of the baffle 10, the plurality of bend locations 18 are bent or can be bent to define an upper panel portion 30, a lower panel portion 32, and a central panel portion 34 in the baffle 10.

The baffle 10 also typically includes at least one opening (e.g., a cavity, a through-hole or the like) for accommodating a component (e.g., a fastener or other elongated member) of an automotive vehicle. In FIGS. 1-4, a through-hole 38 extends through the carrier layers 12, 14 and the layer 16 of expandable material. In the embodiment shown, the through-hole 38 extends through the central panel portion 34 of the baffle 10.

A plurality of fasteners 40 extend through the baffle 10. In the illustrated embodiment each of the plurality of fasteners 40 is a plastic push pin that extends through the first carrier layer 12, the layer 16 of expandable material and the second carrier layer 14. As shown, two of the plurality of fasteners 40 extend through a lower portion 44 of the baffle 10. One of the fasteners 40 extends through the baffle 10 adjacent the upper panel portion 30. Finally, one of the fasteners 40 extends through an upper portion 46 of the baffle 10.

Preferably, the expandable material is a heat activated material having foamable characteristics. The material may be generally dry to the touch or tacky and can be located upon or between one or more carrier layers in any form of desired pattern, placement, or thickness, but typically has a substantially uniform thickness. Exemplary expandable materials include L-5248, L-7002 and L-5204 foams available through L&L Products, Inc. of Romeo, Mich.

Though other heat activated materials are possible for the expandable material, a preferred heat activated material is an expandable plastic, and preferably one that is foamable. Particularly preferred materials are an epoxy-based and EVA (Ethylene Vinyl Acetate) based structural, sealing, baffling or sound-absorbing foams. For example, and without limitation, the structural foam may be an epoxy-based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules.

A number of reinforcing, sealing and/or baffling foams are known in the art and may also be used to produce foam. A typical foam includes a polymeric base material, such as an epoxy resin, an ethylene-based polymer, an acrylate and/or acetate based material or a combination thereof which, when compounded with appropriate ingredients (typically a blowing and curing agent), expands and cures in a reliable and predictable manner upon the application of heat or the occurrence of a particular ambient condition. From a chemical standpoint for a thermally-activated material, the structural foam is usually initially processed as a flowable thermoplastic material before curing. It will cross-link or thermoset upon curing, which makes the material incapable of further flow.

Examples of preferred foam formulations are EVA based and epoxy-based materials that are commercially available from L&L Products of Romeo, Mich., under the designations L5206, L5207, L5208, L5209, L5218, L5224, L-5248, XP321 and XP721. One advantage of the preferred foam materials over prior art materials is that the preferred materials can be processed in several ways. The preferred materials can be processed by injection molding, extrusion, compression molding, application with a mini-applicator, pelletization of the like. This enables the formation and creation of part designs that exceed the capability of most prior art materials. In one preferred embodiment, the structural foam (in its uncured state) is generally is dry or relatively free of tack to the touch, though in some applications tacky material can be used.

While the preferred materials for fabricating the expandable material have been disclosed, the material can be formed of other materials provided that the material selected is heat-activated or otherwise activated by an ambient condition (e.g. moisture, pressure, time or the like) and cures in a predictable and reliable manner under appropriate conditions for the selected application. One such material is the epoxy based resin disclosed in U.S. Pat. No. 6,131,897, the teachings of which are incorporated herein by reference, filed with the United States Patent and Trademark Office on Mar. 8, 1999 by the assignee of this application. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. See also, U.S. Pat. Nos. 5,766,719; 5,755, 486; 5,575,526; and 5,932,680, (incorporated by reference).

In general, it is desirable for the expandable material to have good corrosion resistance properties. Still another desirable expandable material, which includes one or more acrylates, one or more acetates or a combination thereof is disclosed in U.S. provisional patent application Ser. No. 60/482,897 filed Jun. 26, 2003, incorporated herein by reference for all purposes.

In applications where the expandable material is a heat activated, thermally expanding material, an important consideration involved with the selection and formulation of the material comprising the foam is the temperature at which a material reaction or expansion, and possibly curing, will take place. For instance, in most applications, it is undesirable for the material to be reactive at room temperature or otherwise at the ambient temperature in a production line environment. More typically, the expandable material becomes reactive at higher processing temperatures, such as those encountered in an automobile assembly plant, when the foam is processed along with automobile components at elevated temperatures or at higher applied energy levels, e.g., during painting preparation steps or during e-coat or paint baking. While temperatures encountered in an automobile assembly (e-coat or paint bake) operation may be in the range of about 148.89° C. to 204.44° C. (about 300° F. to 400° F.), body and paint shop applications are commonly about 93.33° C. (about 200° F.) or higher. If needed, blowing agent activators can be incorporated into the composition to cause expansion at different temperatures outside the above ranges or expansion at different rates or to different degrees.

Generally, suitable expandable foams have a range of expansion ranging from approximately 0 to over 1000 percent. The level of expansion of the expandable material may be increased to as high as 1500 percent or more. In still other embodiments, it is contemplated that the expandable material expands to at least 2000%, 2500%, 3000% or more relative to its original non-expanded size. Typically, strength is obtained from products that possess low expansion while baffling and/or sound absorption is obtained through greater expansion.

In another embodiment, the expandable material is provided in an encapsulated or partially encapsulated form, which may comprise a pellet, which includes an expandable foamable material, encapsulated or partially encapsulated in an adhesive shell. An example of one such system is disclosed in commonly owned, co-pending U.S. application Ser. No. 09/524,298 ("Expandable Pre-Formed Plug"), hereby incorporated by reference.

In addition, as discussed previously, preformed patterns may also be employed such as those made by extruding a sheet (having a flat or contoured surface) and then die cutting it according to a predetermined configuration in accordance with the chosen container or structure, and applying it thereto.

Installation or assembly of the baffle typically involves placement, either manually, automatically or a combination thereof, within a cavity of an automotive vehicle. Thereafter, the layer of expandable material is expanded to expand (e.g., foam) and wet, and adhere to walls defining the cavity. Upon curing, the baffle forms a layer of foam that substantially entirely seals a cross-section of the cavity for inhibiting the transmission of sound and/or other material or debris through the cavity.

Figure 6:
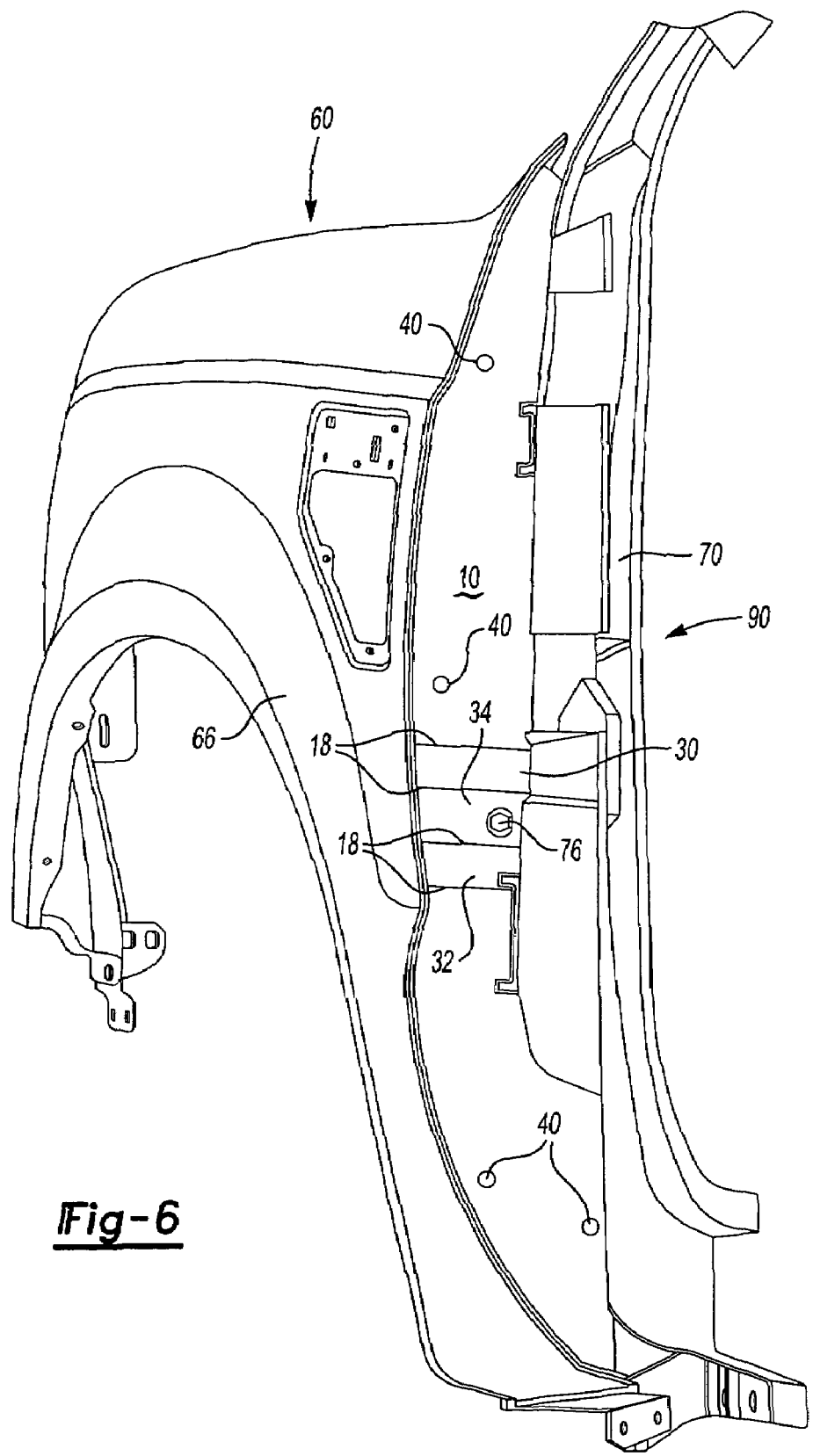
FIG. 6 is a rear view of the portion of the automotive vehicle after assembly of the exemplary baffle of FIGS. 1-4.
Figure 7:
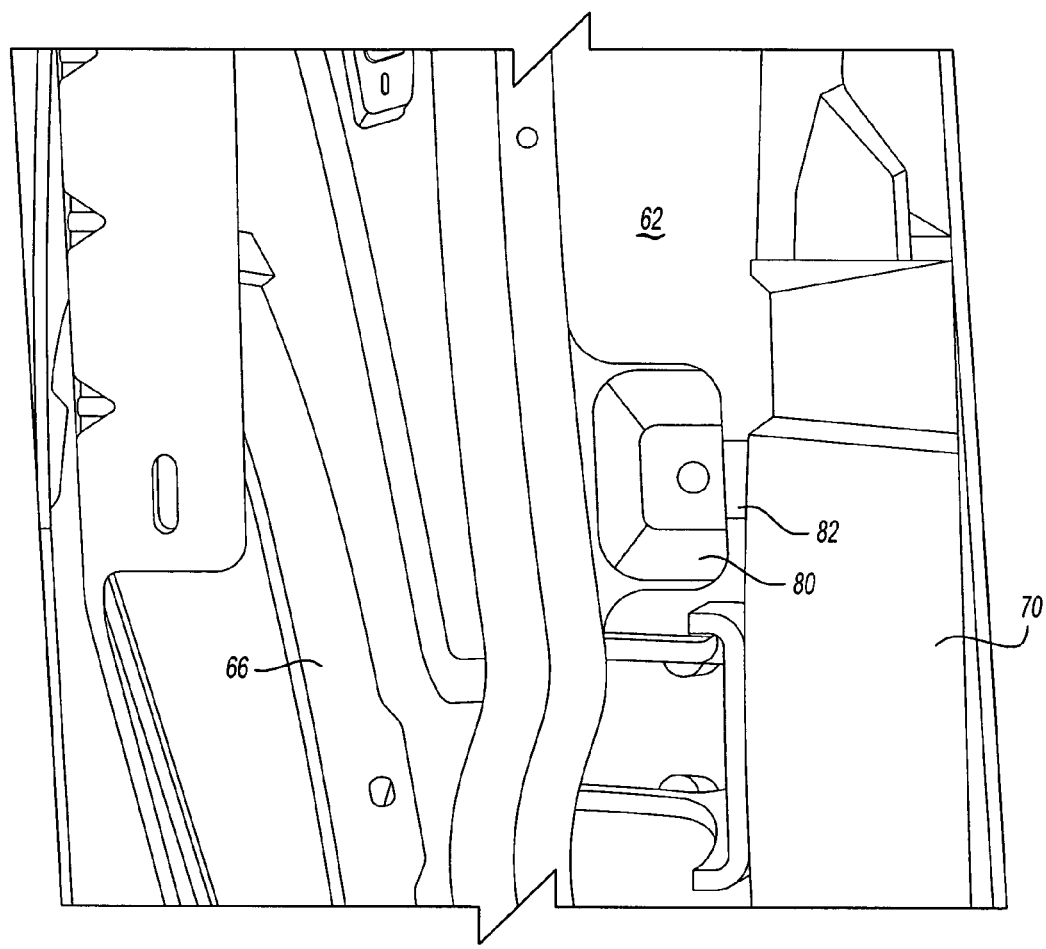
FIG. 7 is a close up view of a portion of an automotive vehicle prior to assembly of the exemplary baffle of FIGS. 1-4.
Figure 8:
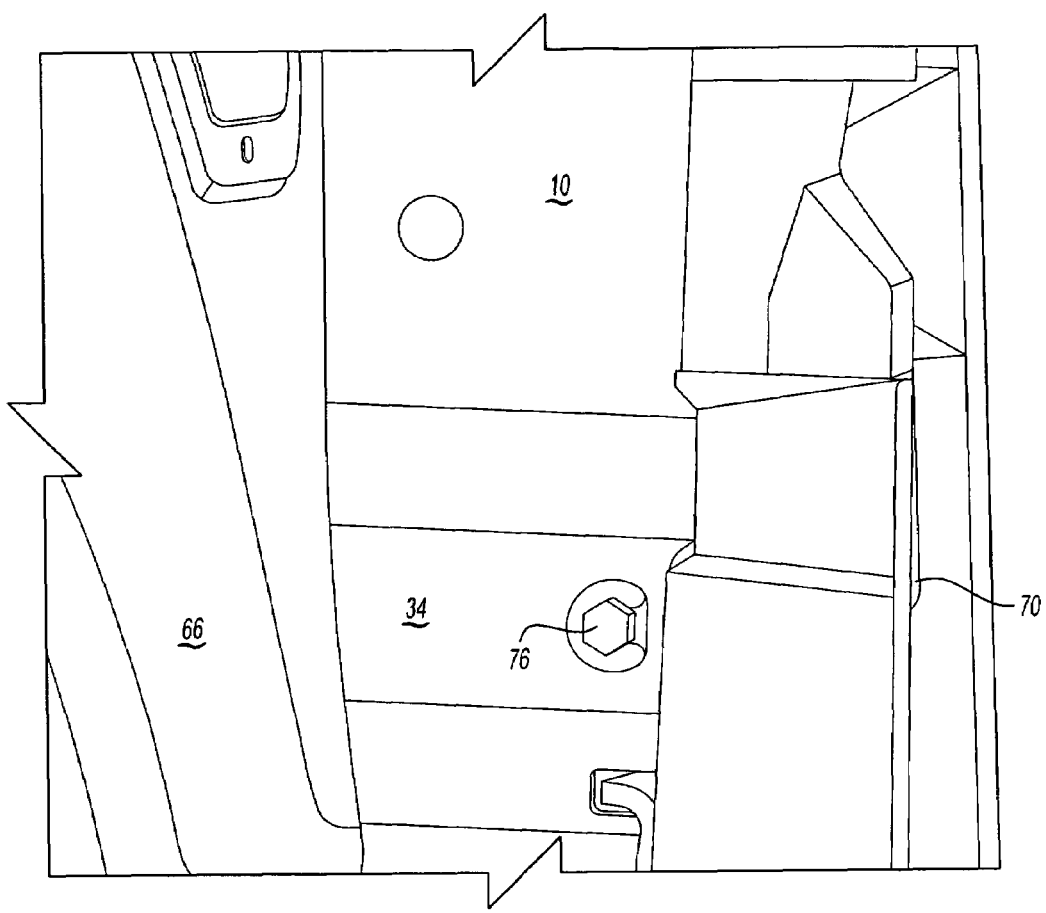
FIG. 8 is a close up view of the portion of the automotive vehicle after assembly of the exemplary baffle of FIGS. 1-4.

In FIGS. 5-8, the baffle 10 is assembled to an automotive vehicle particularly shown as a pick-up truck 60, although other transportation vehicles are possible as well. As can be seen, the baffle 10 is placed in a cavity 62 that is substantially defined by a forward outer body panel 66 (i.e., also referred to as a front fender panel or front quarter panel) of the truck 60 and a pillar 70 (e.g., an A-pillar or hinge pillar) of the vehicle.

During installation, the bend locations 18 may be bent or may be pre-bent such that the upper panel portion 30 and the lower panel portion 32 extend to the central panel portion 34. As a result, the central portion 34 is recessed relative to at least a substantial portion of the rest of the baffle 10.

Typically, assembly of the baffle 10 to the vehicle includes placement of the baffle 10 within the cavity 62 and attachment of the fasteners 40 (e.g., push pins) to flanges 72 that are attached to the panel 66, the pillar 70 or both.

During further assembly of the vehicle, a fastener 76 (shown as a nut and bolt assembly or just a bolt) is received in and/or extended through the opening or through-hole 38 located in the central panel portion of the baffle. In the embodiment shown, at least a portion of the nut and bolt assembly or just the bolt (e.g., the nut, the bolt, the head of the bolt or a combination thereof) is extended through the baffle.

The nut and bolt assembly or just the bolt 76 typically connects the forward body panel 66 of the vehicle to the hinge or A-pillar 20 of the vehicle. In the particular embodiment illustrated, the fastener 38 is fastened to a flange 80 attached to the forward body panel 66 and to a flange 82 attached to the hinge A-pillar 20. Generally, it is contemplated that the bolt 76 may be partially extended through the opening 38 such that a portion of the bolt 76 remains in the opening 38 or the bolt 76 may be fully extended through the opening 38 such that none of the bolt 76 remains in the opening 38.

Preferably, upon exposure to an elevated temperature, typically in an e-coat oven or paint oven, the baffle 10 and particularly the expandable material of the baffle 10 is activated and expands (e.g., foams) to substantially span, baffle and seal a cross-section of the cavity 62 for forming a baffling system 90 that inhibits the transmission of sound and/or other material or debris through the cavity 62.

If a portion of the fastener 76 remains in the opening 38 prior to expansion of the expandable material, the layer 16 of expandable material can advantageously wet, adhere and seal about the fastener 38 (i.e., the nut, the bolt, the head of the bolt or a combination thereof) for inhibiting the transmission of sound or debris about the fastener 38. Alternatively, if the fastener 26 is extended substantially entirely through the opening 38 such that only a small portion or no portion of the fastener 76 remains in the opening 38, the expandable material can advantageously expand across the entirety of the opening 38 such that the baffle 10 remains effective at providing baffling to the cavity. It is also contemplated that, even though no portion of the fastener 76 or only a small portion or the fastener may remain in the opening 38, it is possible that the expandable material could expand outwardly from within the opening 38 to wet, contact and adhere to a portion of the fastener 76 (e.g., a head of the bolt). Advantageously, in such an embodiment, the expandable material, once expanded and cured can assist in damping vibrations of the fastener 76. Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A method of providing baffling to a cavity of an automotive vehicle, comprising:
   providing an elongated baffle having a carrier member formed of a molded plastic material and an expandable material at least partially disposed upon the carrier member for lateral expansion about the periphery of the carrier member, wherein the baffle extends the length of a fender panel and includes an outer edge that substantially conforms to the contour of the fender panel, and at least one opening extends through the baffle proximate to an inner edge of the baffle;
   installing the baffle in a cavity of a structure of an automotive vehicle between the fender panel and a hinge or A pillar of the vehicle;
   bending the baffle at a plurality of bend locations at a central area of the baffle during the installing step;
   passing a bolt at least partially, substantially entirely or entirely through the at least one opening of the baffle, and proximate to at least one of the plurality of bend locations in the central area and the inner edge; and
   expanding the expandable material to seal about the baffle and to seal the at least one opening of the baffle wherein the expandable material expands to:
   i. seal about the bolt;
   ii. contact and adhere to the bolt;
   wherein:
   i. the expandable material substantially seals about a periphery of the baffle;
   ii. the expandable material is substantially tack-free to the touch; and
   iii. the expandable material expands upon exposure to an elevated temperature in an e-coat or paint oven.

2. A method as in claim 1 wherein the carrier member is a carrier layer.

3. A method as in claim 2 wherein the expandable material is formed as a layer that is substantially coextensive with the carrier layer.

4. A method as in claim 1 wherein the baffle includes multiple bend locations.

5. A method as in claim 1 wherein the carrier member is formed of a first layer and a second layer with the expandable material at least partially disposed therebetween.

6. A method as in claim 1 wherein the baffle includes a length with a tapered upper end and a tapered lower end.

7. A method as in claim 1 wherein the baffle includes one or more fasteners for at least temporarily securing the baffle in the cavity of the structure of the automotive vehicle.

8. The method of claim 7, wherein the one or more fasteners include at least one push pin.

9. A method as in claim 7 wherein the one or more fasteners include a plurality of mechanical interference fitting fasteners.

10. A method as in claim 1 wherein the fasteners is extended through the opening in the baffle and employed to connect a fender of the vehicle to an A-pillar of the vehicle.

11. A method as in claim 1 wherein the automotive vehicle is a pick-up truck.

12. A method of providing baffling to a cavity of an automotive vehicle, comprising:

providing a baffle having a carrier layer formed of a molded plastic material and an expandable material disposed upon the carrier layer wherein:
i. at least one opening extends through the baffle;
ii. the at least one opening in the baffle is selected from a cavity or a through-hole;
iii. the at least one opening in the baffle extends through the carrier member, the expandable material or both;
iv. the baffle includes multiple bend locations;
v. the baffle includes one or more plastic push pin fasteners for at least temporarily securing the baffle in the cavity of the structure of the automotive vehicle;
placing the baffle in a cavity of a structure of an automotive vehicle adjacent a fender panel and a hinge or A pillar of the vehicle;
passing a bolt at least partially, substantially entirely or entirely through the opening of the baffle such that the bolt can connect the panel to the pillar;
expanding the expandable material to seal about the baffle and to seal the opening of the baffle wherein the expandable material either expands to:
i. seal about the bolt;
ii. contact and adhere to the bolt; or
iii. expand across the entirety of the opening of the baffle;
wherein:
i. the expandable material is co-extensive with the carrier layer and substantially seals about a periphery of the baffle;
ii. the expandable material is substantially tack-free to the touch; and
iii. the expandable material expands upon exposure to an elevated temperature in an e-coat or paint oven.

13. A method of providing baffling to a cavity of an automotive vehicle, comprising:
providing a baffle having at least one opening, a pair of carrier layers and a layer of expandable material disposed therebetween wherein:
i. the at least one opening in the baffle is a through-hole;
ii. the at least one opening in the baffle extends through the carrier member, the expandable material or both;
iii. the carrier layers are formed of metal foils;
iv. the baffle includes multiple bend locations;
v. the plurality of bend locations define an upper panel portion, a lower panel portion, and a central panel portion in the baffle; and
vi. the baffle includes one or more fasteners for at least temporarily securing the baffle in the cavity of the automotive vehicle
placing the baffle in the cavity of the automotive vehicle between a fender panel and a hinge or A pillar of the vehicle;
passing a bolt substantially entirely through the opening of the baffle such that the bolt can connect the panel to the hinge or A pillar;
expanding the expandable material to seal about the baffle and to seal the opening of the baffle wherein the expandable material either expands to:
i. seal about the bolt;
ii. contact and adhere to the bolt; or
iii. expand across the entirety of the opening of the baffle;
wherein:
i. the expandable material substantially seals about a periphery of the baffle;
ii. the expandable material is substantially tack-free to the touch; and
iii. the expandable material expands upon exposure to an elevated temperature in an e-coat or paint oven.

14. The method of claim 12, wherein the at least one opening in the baffle extends through the carrier member.

15. The method of claim 14, wherein the expandable material expands to contact and adhere to the bolt.

16. The method of claim 12, wherein the at least one opening in the baffle extends through the expandable material.

17. The method of claim 14, wherein the expandable material expands to seal about the bolt or to expand across the entirety of the opening of the baffle.

18. The method of claim 16, wherein the expandable material expands to contact and adhere to the bolt.

19. The method of claim 12, wherein the baffle is placed between a fender panel and a hinge of the vehicle.

20. The method of claim 16, wherein the expandable material expands to seal about the bolt or to expand across the entirety of the opening of the baffle.

21. The method of claim 19, wherein the expandable material expands to contact and adhere to the bolt.

22. The method of claim 19, wherein the expandable material expands to seal about the bolt or to expand across the entirety of the opening of the baffle.

23. The method of claim 12, wherein the baffle is placed between a fender panel and A pillar of the vehicle.

24. The method of claim 23, wherein the expandable material expands to contact and adhere to the bolt.

25. The method of claim 23, wherein the expandable material expands to seal about the bolt or to expand across the entirety of the opening of the baffle.

26. The method of claim 12, wherein the expandable material expands to contact and adhere to the bolt.

27. The method of claim 12, wherein the expandable material expands to seal about the bolt or to expand across the entirety of the opening of the baffle.

28. A method of providing baffling to a cavity of an automotive vehicle, comprising:
providing an elongated baffle extending the length of a fender panel and having a carrier member formed of a molded plastic material and an expandable material at least partially disposed upon the carrier member for lateral expansion about the periphery of the carrier member, wherein the baffle includes:
i. a tapered upper end in an upper portion of the baffle, a tapered lower end in a lower portion of the baffle, and a central portion of the baffle therebetween;
ii. an inner edge having generally flat portions, wherein at the lower portion of the baffle, a first portion of the inner edge is inwardly displaced relative to a second portion of the inner edge at the upper portion of the baffle;
iii. an arcuate outer edge substantially conforming to the contour of the fender panel so as to form the tapered upper end and the tapered lower end with the inner edge;
iv. a plurality of through-holes proximate to the outer edge that extend through the baffle that receive a plurality of push pin fasteners; and
v. at least one opening proximate to the inner edge of the central portion of the baffle for accommodating a component of the automotive vehicle;
installing the baffle in a cavity of a structure of an automotive vehicle between the fender panel and a hinge or A pillar of the vehicle;
attaching the plurality of push pin fasteners to at least one component that defines the cavity of the automotive vehicle to at least temporarily secure the baffle in the cavity, the fasteners extending through the plurality of through-holes;

passing a bolt at least partially through the at least one opening of the baffle to connect the panel to the hinge or A pillar;

expanding the expandable material to seal about the baffle and to seal the at least one opening of the baffle wherein the expandable material expands to:

i. seal about the bolt;
ii. contact and adhere to the bolt;

wherein:

i. upon expansion the expandable material substantially seals about a periphery of the baffle for inhibiting the transmission of sound, debris, or both through the cavity;

ii. the expandable material is substantially tack-free to the touch in the expandable material's uncured state; and iii. the expandable material expands to form a polymeric foam upon exposure to an elevated temperature in an e-coat or paint oven.

29. The method of claim 28, wherein the baffle further includes at least one cut-out along the inner edge so as to provide clearance for a door hinge, the at least one cut-out having a recessed portion.

* * * * *

UNITED STATES PATENT AND TRADEMARK OFFICE
CERTIFICATE OF CORRECTION

PATENT NO. : 7,428,774 B2  
APPLICATION NO. : 11/136742  
DATED : September 30, 2008  
INVENTOR(S) : Thomas et al.

It is certified that error appears in the above-identified patent and that said Letters Patent is hereby corrected as shown below:

Title Page, Col. 2, line 7  
Replace Reference No. 6,103,341 with 6,103,641

Signed and Sealed this

Third Day of February, 2009

JOHN DOLL  
*Acting Director of the United States Patent and Trademark Office*